(12) United States Patent
Kuwabara

(10) Patent No.: US 8,783,750 B2
(45) Date of Patent: Jul. 22, 2014

(54) COVER MEMBER FOR AUTOMOBILES

(71) Applicant: Nishikawa Rubber Co., Ltd., Hiroshima (JP)

(72) Inventor: Hirokazu Kuwabara, Takehara (JP)

(73) Assignee: Nishikawa Rubber Co., Ltd., Hiroshima-Shi, Hiroshima-Ken (JP)

( * ) Notice: Subject to any disclaimer, the term of this patent is extended or adjusted under 35 U.S.C. 154(b) by 0 days.

(21) Appl. No.: 13/735,519

(22) Filed: Jan. 7, 2013

(65) Prior Publication Data

US 2013/0187411 A1    Jul. 25, 2013

(30) Foreign Application Priority Data

Jan. 19, 2012   (JP) ................. 2012-009503

(51) Int. Cl.
*B60R 13/02*    (2006.01)

(52) U.S. Cl.
USPC ....... 296/1.08; 296/209; 296/146.9; 296/199; 296/93; 49/490.1

(58) Field of Classification Search
USPC .............. 296/1.02, 146.9, 209, 199, 1.08, 93, 296/216.04, 216.09; 49/490.1, 475.1
See application file for complete search history.

(56) References Cited

U.S. PATENT DOCUMENTS

| | | | | |
|---|---|---|---|---|
| 5,367,830 A * | 11/1994 | Omura et al. | ................ | 49/475.1 |
| 5,469,667 A * | 11/1995 | Le Marrec | ................... | 49/477.1 |
| 5,866,232 A * | 2/1999 | Gatzmanga | ................... | 428/122 |
| 6,601,346 B2 * | 8/2003 | Nozaki | ......................... | 49/498.1 |
| 6,820,372 B2 * | 11/2004 | Nozaki | ......................... | 49/498.1 |
| 7,083,212 B2 * | 8/2006 | Randazzo | .................... | 296/1.08 |
| 7,097,180 B2 * | 8/2006 | Kuzuya et al. | ................ | 277/644 |
| 2003/0019160 A1 * | 1/2003 | Oda et al. | ..................... | 49/498.1 |
| 2004/0079032 A1 * | 4/2004 | Russell et al. | ............... | 49/498.1 |
| 2004/0137197 A1 * | 7/2004 | Watanabe | ..................... | 428/122 |
| 2006/0162257 A1 * | 7/2006 | Nozaki et al. | ................ | 49/490.1 |
| 2007/0180776 A1 * | 8/2007 | Oba et al. | ..................... | 49/498.1 |
| 2008/0022600 A1 * | 1/2008 | Hughes et al. | .............. | 49/479.1 |
| 2008/0229670 A1 | 9/2008 | Iwasa et al. | | |
| 2009/0000206 A1 * | 1/2009 | Okajima et al. | ............. | 49/493.1 |
| 2010/0263292 A1 * | 10/2010 | Harland | ...................... | 49/475.1 |

FOREIGN PATENT DOCUMENTS

| | | |
|---|---|---|
| EP | 0 627 333 A1 | 12/1994 |
| EP | 1 193 097 A2 | 4/2002 |
| JP | 04-113949 A | 4/1992 |
| JP | 2001284370 A | 10/2001 |

OTHER PUBLICATIONS

Communication (European Search Report dated Apr. 24, 2013 issued in related European Patent Application No. 13150124.9 (5 pages).

* cited by examiner

*Primary Examiner* — Pinel Romain
(74) *Attorney, Agent, or Firm* — Robert P. Michal; Lucas & Mercanti LLP

(57) ABSTRACT

A cover member for automobiles comprises: a cover body 20 extending lengthwise and having an anchoring part 23 formed thereon protruding toward the panel 10 side; a protective member 30 having a substantially U-shape in cross-section which fastens the top end 21, the substantially U-shape including: a first side wall 31 having a hook part 34 formed thereon for fitting with the anchoring part 23; a second side wall 32 which makes elastic contact with an inner side compared with the top end of the cover body 20; and a connecting wall 33; wherein a projection 40 is formed on an outer side of the first side wall 31 for the first side wall 31 to expand with respect to the second side wall 32 when the protective member 30 is bent so that the connecting wall 33 warps.

20 Claims, 7 Drawing Sheets

US 8,783,750 B2

COVER MEMBER FOR AUTOMOBILES

This application claims the benefit under 35 USC 119 of JP Patent Application JP 2012-009503 filed Jan. 19, 2012, the entire disclosure of which is incorporated herein by reference.

BACKGROUND OF THE INVENTION

The present invention relates to a cover member for automobiles for partially covering up a panel forming an article that opens and closes including a body or a door of an automobile.

As shown in FIG. 9 and FIG. 10, an ordinary cover member for automobiles has been disclosed for partially covering up the panel forming the article that opens and closes including the body or the door of the automobile, comprising: a rocker panel 2 as a protective plate for protecting a side sill under right and left side doors 1 of automobiles from scattered pebbles or tar pitch; a rocker protector 3 covering the rocker panel 2; and an edge protector 4 fixed to a top end of the rocker protector 3 for sealing a space between the rocker panel 2 and the rocker protector 3 (see, for example, the Japanese unexamined Patent Publication No. H04-113949).

The edge protector 4 comprises: a lip-shaped seal part 4a which curves for abutting a lower end edge 1a of the door 1; an abutting piece 4b adheringly abuts the rocker panel 2; and a fixing piece 4c having an anchoring ditch 4d formed therein.

According to the structure, since the edge protector 4 is unremovably fixed to a hook part 3a provided on the top end of the rocker protector 3 by engaging with the hook part 3a, the edge protector 4 does not easily come off from the rocker protector 3 even in case the door is strongly closed.

According to the prior art (FIG. 10), the edge protector 4 is assembled on the rocker protector 3 by pressing and fitting the hook part 3a on a top end of the rocker protector 3 in the anchoring ditch 4d of the edge protector 4.

More specifically, as shown by an arrow 80 of FIG. 10, operators assemble the edge protector 4 on the rocker protector 3 by pressing the edge protector 4 with fingers at regular intervals, substantially 20 mm (millimeter), in such a manner that the hook part 3a on the top end of the rocker protector 3 is fit in the anchoring ditch 4d of the edge protector 4. As the total length of a product is longer, 1500 mm (millimeter) in the present case, time required for the operation becomes longer, which brings about pain in the operators' fingers.

Therefore, an object of the present invention is to provide a cover member for automobiles capable of reducing time for assembly and burden for the operators.

SUMMARY OF THE INVENTION

In order to achieve the above-mentioned object, according to one aspect of the invention, a cover member for automobiles is provided for partially covering up a panel (10) forming an article that opens and closes including a body or a door of an automobile, the cover member comprising:

a cover body (20) extending lengthwise, of which top end (21) side is mounted in such a manner as to extend substantially in parallel with said panel (10) and the top end (21) has an anchoring part (23) formed thereon protruding toward the panel (10) side while being separate from the panel (10);

a protective member (30) having a substantially U-shape in cross-section which fastens the top end (21) of said cover body (20) from an opposite side to said panel (10) side, the substantially U-shape including: a first side wall (31) having a hook part (34) formed thereon for covering up an anchoring part (23) of said cover body (20) thereby fitting with the anchoring part (23); a second side wall (32) which makes elastic contact with a surface side on an inner side compared with the top end (21) of the cover body (20); and a connecting wall (33) connecting the first side wall (31) and the second side wall (32); wherein a projection (40) is formed on an outer side of the first side wall (31) for the first side wall (31) to expand with respect to the second side wall (32) when the protective member (30) is bent so that the connecting wall (33) of said protective member (30) warps toward an opposite side to a side in which the first side wall (31) and the second side wall (32) extend.

In addition, according to an aspect of the invention, a cover member for automobiles is provided, wherein: said connecting wall (33) is semicylindrically swelled and curved toward an outer side.

In addition, according to an aspect of the invention, a cover member for automobiles is provided, wherein: a first seal lip (37) having a substantially tongue shape in cross-section is formed on a connecting position of the first side wall (31) and the connecting wall (33) of said protective member (30), the first seal lip (37) being semicylindrically curved from the connecting position along said connecting wall (33) and sealing a space between the protective member (30) and said panel (10) by making elastic contact with the panel (10).

In addition, according to an aspect of the invention, a cover member for automobiles is provided, wherein: a top end (21) of said cover body (20) is an end on a vertical surface (25) side of a substantially L-shape in cross-section comprising a flat surface (24) approaching said panel (10) and bending at substantially a right angle thereby forming the vertical surface (25); and a second seal lip (39) having a substantially tongue shape in cross-section is formed on a connecting position of the second side wall (32) and the connecting wall (33) of said protective member (30), the second seal lip (39) being semicylindrically curved from the connecting position along said connecting wall (33) and covering a corner (27) between said flat surface (24) and the vertical surface (25) by making elastic contact with a surface side of said flat surface (24).

In addition, according to an aspect of the invention, a cover member for automobiles is provided, wherein: said second side wall (32) of said protective member (30) extends at an obtuse angle with respect to the connecting wall (33).

In addition, according to an aspect of the invention, a cover member for automobiles is provided, wherein: said panel (10) is a side sill and said cover body (20) is a rocker panel.

Symbols in parentheses show constituents or items corresponding to Figures and DESCRIPTION OF PREFERRED EMBODIMENT.

The present invention relates to the cover member for automobiles comprising the cover body and the protective member for partially covering up the panel forming an article that opens and closes including the body or the door of the automobile. The protective member having a substantially U-shape in cross-section, including the first side wall, the second side wall and the connecting wall has the hook part formed on the first side wall. The protective member is assembled on the cover body in such a manner that the protective member covers up the anchoring part formed on the top end of the cover body and the hook part fits with the anchoring part. Accordingly, the protective member once assembled on the cover body does not easily come off.

In addition, since the projection is formed on the outer side of the first side wall so that the first side wall expands with respect to the second side wall when the connecting wall is bent to warp toward the opposite side to the side in which the first side wall and the second side wall extend, the protective member is simply assembled on the cover body.

More specifically, while the hook part formed on the first side wall as one end side of the protective member is applied to the anchoring part of the cover body, and then the other end side of the protective member is bent to warp, at an angle of 90 degrees for example, the hook part as well as the first side wall automatically expands with respect to the second side wall. Accordingly, when protective member reverts to be linear from the one end side over the other end side, the hook part of the protective member automatically fits with the anchoring part of the cover body while reverting to be a former closed state from the expanded state.

The structure does not necessitate the operation of pressing the edge protector with fingers at regular intervals as in the prior art and enables to assemble the protective member on the cover body consecutively. Such a structure reduces time for assembly and does not cause pain in the operators' fingers.

Especially, since the connecting wall is semicylindrically swelled and curved toward the outer side, the first side wall easily expands with respect to the second side wall when the protective member is bent.

In addition, according to the present invention, the first seal lip, which is semicylindrically curved from the connecting position along the connecting wall and sealing the space between the protective member and the panel, is formed on the connecting position of the first side wall and the connecting wall of the protective member. Such a structure improves an external appearance and is excellent in sealing property.

In addition, according to the present invention, a part of the cover body is a substantially L-shape in cross-section and the second seal lip, which is semicylindrically curved from the connecting position along the connecting wall and covering the corner between the flat surface and the vertical surface, is formed on the connecting position of the second side wall and the connecting wall of the protective member. Such a structure further improves the external appearance.

In addition, according to the present invention, the second side wall of the protective member extends at the obtuse angle with respect to the connecting wall. Therefore, when the protective member is bent, the first side wall further expands with respect to the second side wall and is more easily assembled compared with a case in which the second side wall extends substantially at a right angle with respect to the connecting wall.

DESCRIPTION OF PREFERRED EMBODIMENT

Figure 1:
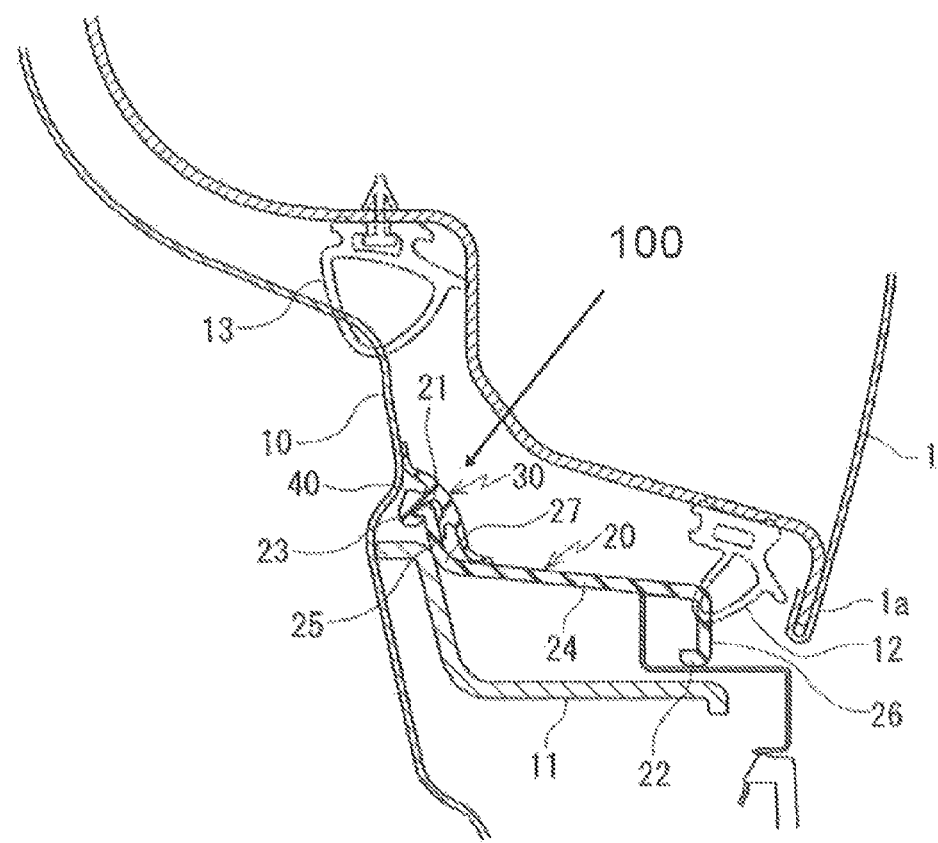
FIG. 1 is a I-I line cross section of FIG. 9, showing a state that a cover member for automobiles according to an embodiment of the present invention is mounted.
Figure 2:
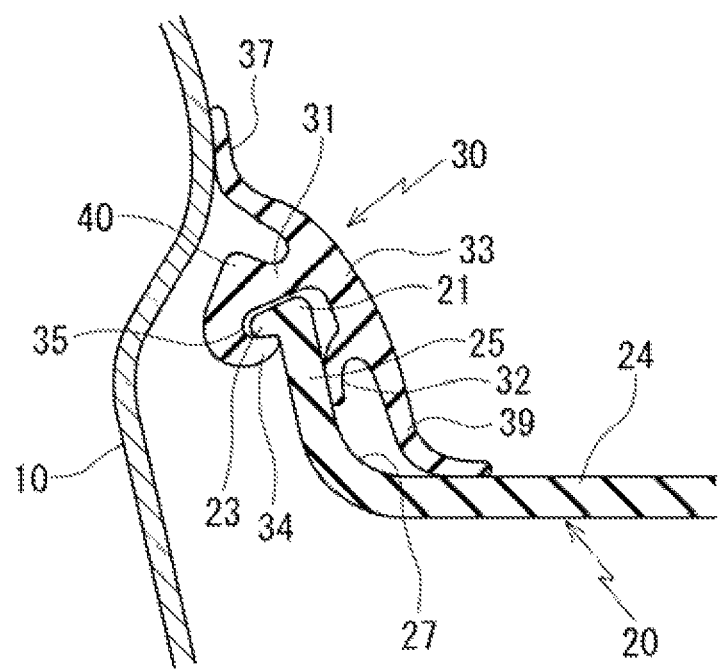
FIG. 2 is an enlarged cross section of the cover member for automobiles according to the embodiment of the present invention.
Figure 3:
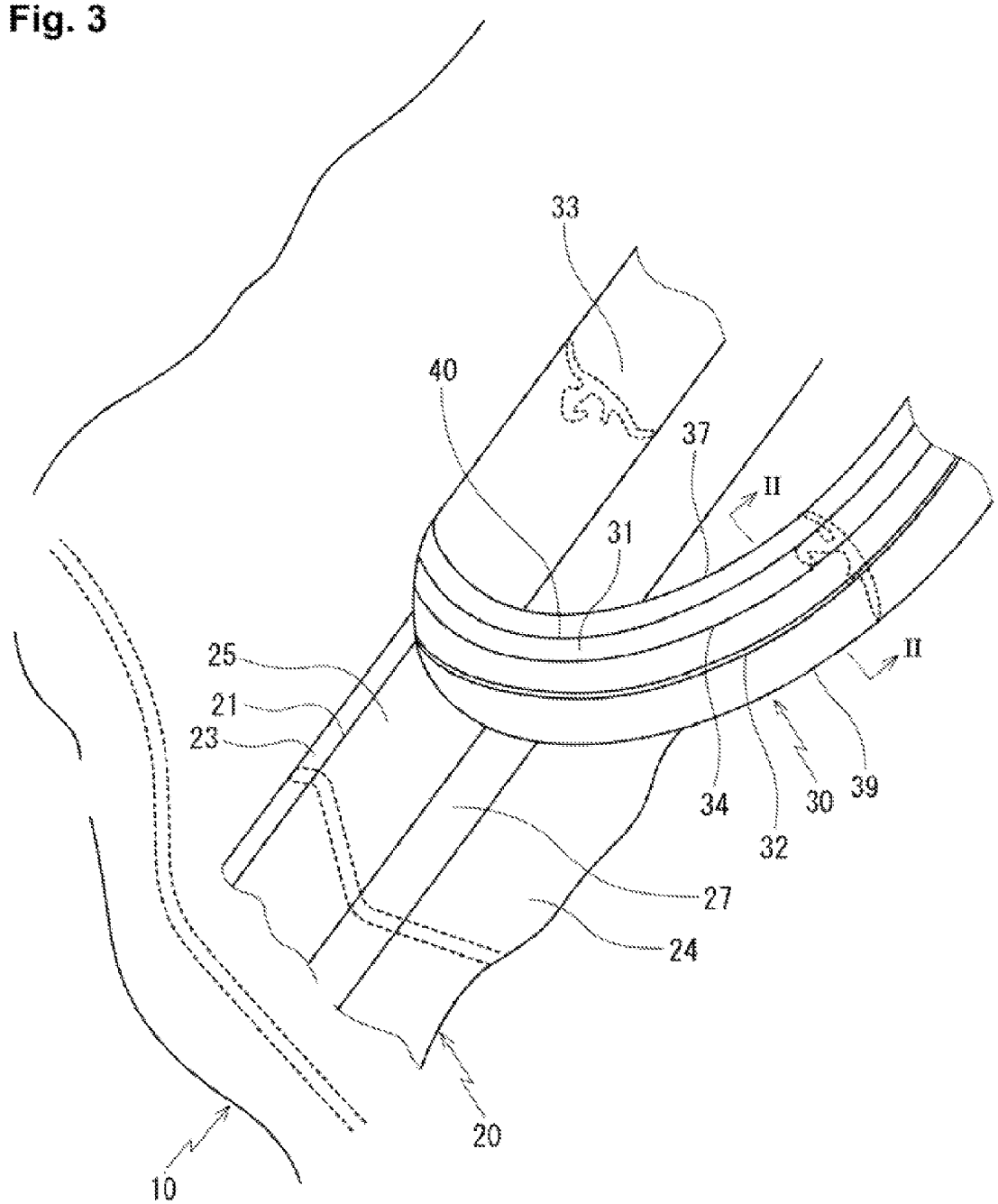
FIG. 3 is a perspective view showing an assembled state of the cover member for automobiles according to the embodiment of the present invention.
Figure 4:
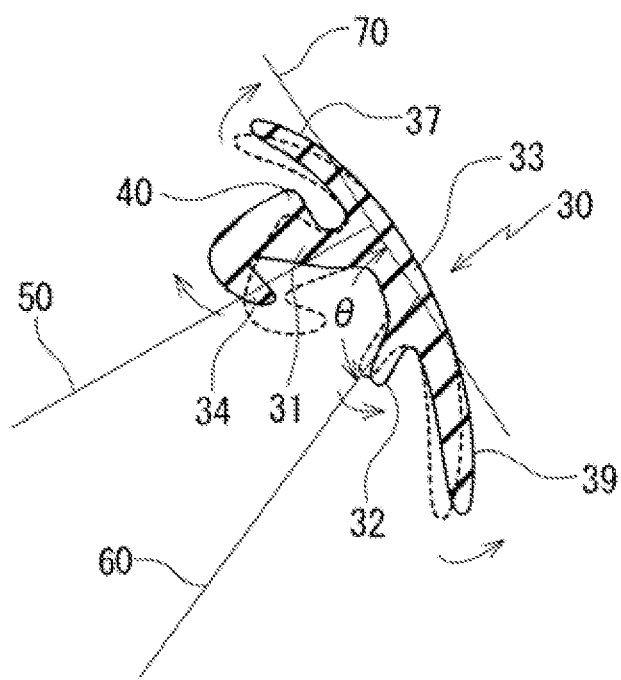
FIG. 4 is a II-II line enlarged cross section of FIG. 3.

Referring to FIG. 1. to FIG. 4, a cover member 100 for automobiles according to an embodiment of the present invention will be described. FIG. 1 shows a state that a cover member 100 for automobiles according to an embodiment of the present invention is mounted. FIG. 2 is an enlarged cross section of the cover member 100 for automobiles. In FIG. 4, a solid line is a II-II line enlarged cross section of FIG. 3, showing a deformed shape in an assembled state whereas a broken line shows a shape before deformation. When constituents or items correspond to those in prior arts, the same symbols are used.

The cover member for automobiles according to the embodiment of the present invention partially covers up a panel forming an article that opens and closes including the body or the door of the automobile and comprises a cover body 20 and a protective member 30. In the present embodiment, a panel 10 forming the article that opens and closes including the body or the door of the automobile is a side sill under right and left side doors 1 of the automobile, and a rocker panel covering up the side sill is the cover body 20 of the present invention having a protective member 30 assembled thereon.

The cover body 20 extends long in a front and rear direction of the automobile. A part of the cover body 20 is a substantially L-shape in cross-section, comprising a flat surface 24 which approaches the panel 10 substantially levelly and a vertical surface 25 which bends and rises substantially vertically from a panel 10 side of the flat surface 24. The vertical surface 25 on the top end 21 side of the cover body 20 is mounted on the panel 10 substantially in parallel with the panel 10 via a support member 11 or a fixing member including a clip or a bolt which are omitted in Figs. A rear end 22 side of the cover body 20 is a downward surface 26 bending downward substantially at a right angle from the flat surface 24. A weather strip 12 provided on an inner side of a lower end edge 1a of the door 1 makes elastic contact with the corner part which connects the flat surface 24 and the downward surface 26 whereas a weather strip 13 provided on an inner-cabin side of the door 1 makes elastic contact with the panel 10 when the door is closed, thereby sealing an outer and inner side of the automobile.

The top end 21 of the cover body 20 has an anchoring part 23 formed thereon. The anchoring part 23 protrudes toward a back side (inner-cabin side) as the panel 10 side while being separate from the panel 10. The anchoring part 23 protrudes at substantially a right angle with respect to the direction in which the vertical surface 25 on the top end 21 side of the cover body 20 extends.

Material of the cover body 20 is not especially limited. In the present embodiment, the cover body 20 is made of resin.

The protective member 30 is a long extrusion-molded article, which extends in a front and rear direction of the automobile when assembled. The protective member 30 has a substantially U-shape in cross-section which fastens the top end 21 of the cover body 20 from a surface side (outer-cabin side) as the opposite side to the panel 10 side. The substantially U-shape includes: a first side wall 31, a second side wall 32, a connecting wall 33, a first seal lip 37 formed on a connecting position of the first side wall 31 and the connecting wall 33 and a second seal lip 39 formed on a connecting position of the second side wall 32 and the connecting wall 33.

As shown by a broken line in FIG. 4, before the protective member 30 is deformed, that is a state before the protective member 30 is assembled, the first side wall 31 extends in a direction 50 substantially at an angle of 90 degrees with respect to the direction 70 in which the connecting wall 33 extends. When the protective member 30 is assembled, the first side wall 31 extends toward the panel 10 side. The top end of the first side wall 31 is bent in such a manner as to curve toward the second side wall 32 side as an inner side of the first side wall 31 and has a hook part 34 formed thereon. When the protective member 30 is assembled on the cover body 20, the hook part 34 covers up the anchoring part 23 of the cover body 20 from the surface side (outer-cabin side) in such a manner as to put the anchoring part 23 in a ditch 35, thereby fitting with the anchoring part 23.

A projection 40 is formed on an outer side of the first side wall 31, that is an opposite side to the second side wall side 32. The projection 40 is a lump having a substantially triangular shape in cross-section and does not abut the first seal lip 37. The projection 40 thus formed improves rigidity of the first side wall 31 and moves center of gravity of the first side wall 31 in cross section toward an outer side so that the first side wall 31 widely expands with respect to the second side wall 32 as shown by a solid line in FIG. 4 when the protective member 30 is bent as shown in FIG. 3 in such a manner that the connecting wall 33 of the protective member 30 warps toward an opposite side to a side in which the first side wall 31 and the second side wall 32 extend.

As shown by the broken line in FIG. 4, before the protective member 30 is deformed, that is the state before the protective member 30 is assembled, the second side wall 32 extends in a direction 60 at an obtuse angle of θ with respect to a direction 70 in which the connecting wall 33 extends. When the protective member 30 is assembled on the cover body 20, as shown in FIG. 2, the second side wall 32 makes elastic contact with the surface side of the cover body 20 which is an inner side compared with the top end 21. The second side wall 32 is shorter than the first side wall 31 in length and thinner than a base root of the first side wall 31 in thickness.

The connecting wall 33 which connects the first side wall 31 and second side wall 32 is semicylindrically swelled and curved toward the surface side (outer-cabin side).

As shown by the broken line in FIG. 4, before the protective member 30 is deformed, that is the state before the protective member 30 is assembled, a first seal lip 37 has a substantially tongue shape in cross-section, which is tapered toward the top end. The first seal lip 37 is formed on a connecting position of the first side wall 31 and the connecting wall 33 and is semicylindrically curved toward the surface side (outer-cabin side) from the connecting position along the connecting wall 33. When the protective member 30 is assembled on the cover body 20, as shown in FIG. 2, the first seal lip 37 seals a space between the protective member 30 and the panel 10 for improving an external appearance and performing sealing property of preventing entrance of water from the space between the protective member 30 and the panel 10. The first seal lip 37 is as long as the connecting wall 33.

As shown by the broken line in FIG. 4, before the protective member 30 is deformed, that is the state before the protective member 30 is assembled, a second seal lip 39 has a substantially tongue shape in cross-section, which is tapered toward the top end. The second seal lip 39 is formed on a connecting position of the second side wall 32 and the connecting wall 33 and is semicylindrically curved toward the surface side (outer-cabin side) from the connecting position along the connecting wall 33. When the protective member 30 is assembled on the cover body 20, as shown in FIG. 2, the second seal lip 39 covers a corner 27 between the flat surface 24 and the vertical surface 25 by making elastic contact with a surface side of the flat surface 24 of the cover body 20 for improving the external appearance and further stabilizing the assembled state of the protective member 30 on the cover body 20. The second seal lip 39 is as long as the connecting wall 33.

Material of the protective member 30 is not especially limited. In the present embodiment, the protective member 30 is made of solid material of rubber-like elastic body.

When the protective member 30 is assembled on the cover body 20, as shown in FIG. 3, the hook part 34 formed on the first side wall 31 on one end side of the protective member 30 extending lengthwise is applied to the anchoring part 23 of the cover body 20, by pressing the hook part 34 with the operator's right hand for example, and then the other end side of the protective member 30 is bent to warp at an angle of 90 degrees with the operator's left hand.

According to the structure, as shown by the solid line in FIG. 4, the hook part as well as the first side wall 31 automatically expands with respect to the second side wall 32. In the state, the second side wall 32, the first seal lip 37 and the second seal lip 39 as well as the first side wall 31 slightly expand.

As the operator reverts the other end of the protective member 30 thus bent to be linear by slipping the left hand toward the front side while pressing one end side of the protective member 30 with the right hand, the hook part 34 of the protective member 30 automatically fits with the anchoring part 23 of the cover body 20 while the expanded state reverts to be a former closed state.

According to the structure, since the hook part 34 of the protective member 30 fits with the anchoring part 23 formed on the top end of the cover body 20 while covering up the anchoring part 23 from an outer side, the protective member 30 once assembled on the cover body 20 does not easily come off.

As a result, operators do not have to fit the protective member 30 with the cover body 20 by pressing the protective member 30 with fingers at regular intervals as in the prior art and the protective member 30 can be consecutively assembled on the cover body 20. Such a structure reduces time for assembly and does not bring about pain in the assembly operators' fingers.

In the present embodiment, the second side wall 32 extends in a direction 60 at an obtuse angle of θ with respect to a direction 70 in which the connecting wall 33 extends so that the second side wall 32 easily expands when the protective member 30 is bent. But the protective member 30 can also be easily assembled on the cover body 20 even in case the second side wall 32 extends substantially at an angle of 90 degrees with respect to the direction 70 in which the connecting wall 33 extends.

Figure 5:
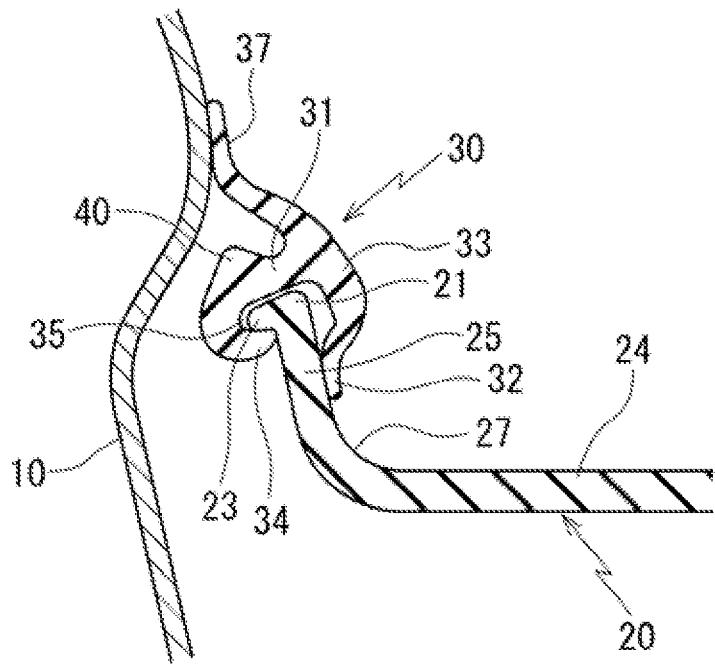
FIG. 5 is an enlarged cross section of a variation of the cover member for automobiles according to the embodiment of the present invention.
Figure 6:
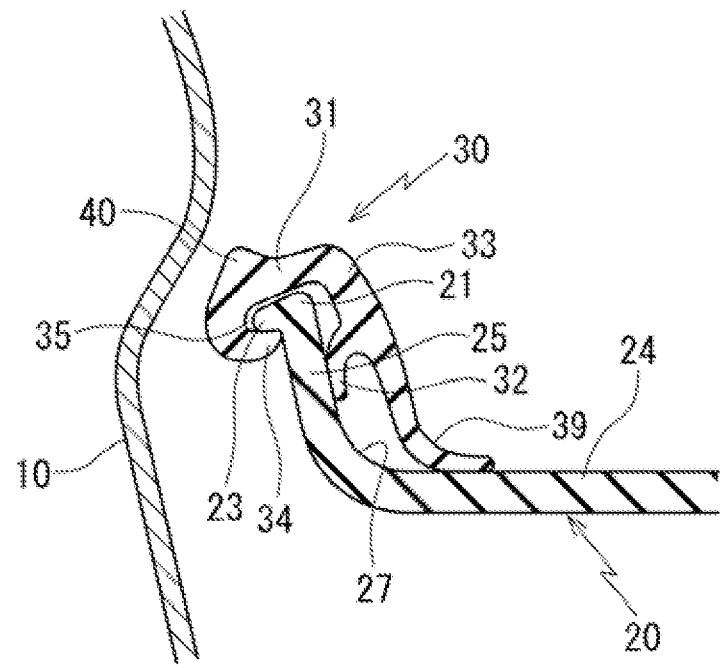
FIG. 6 is an enlarged cross section of another variation of the cover member for automobiles according to the embodiment of the present invention.
Figure 7:
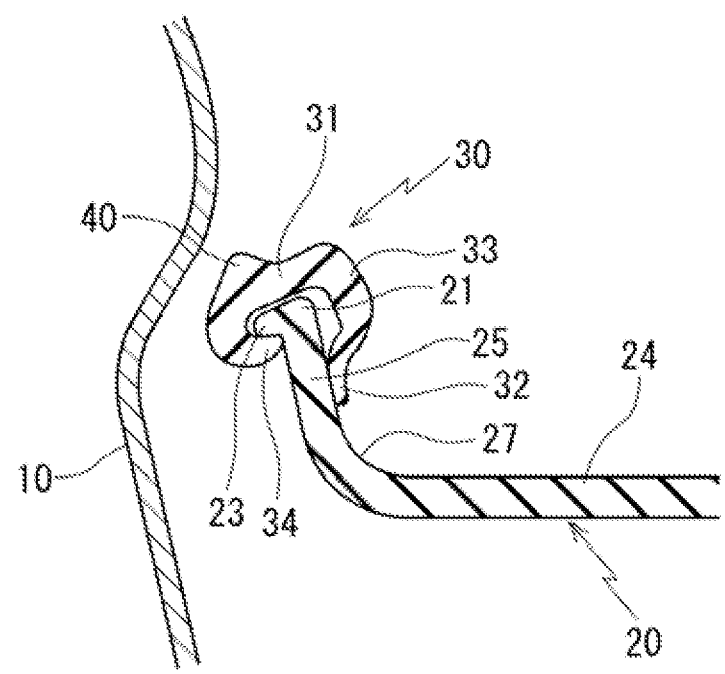
FIG. 7 is an enlarged cross section of still another variation of the cover member for automobiles according to the embodiment of the present invention.

In the present embodiment, the protective member 30 comprises the first side wall 31 with the projection 40, the second side wall 32, the connecting wall 33, the first seal lip 37 and the second seal lip 39. But, as shown in FIG. 5 and FIG. 6, the first seal lip 37 or the second seal lip 39 may be omitted. Alternatively, as shown in FIG. 7, both the first seal lip 37 and the second seal lip 39 may be omitted. Especially, as shown in FIG. 5 and FIG. 7, as the second seal lip 39 is omitted, the cover body 20 is not necessarily of a substantially L-shape in cross-section comprising the flat surface 24 and the vertical surface 25 as long as the protective member 30 can be assembled on the top end 21 of the cover body 20.

Figure 8:
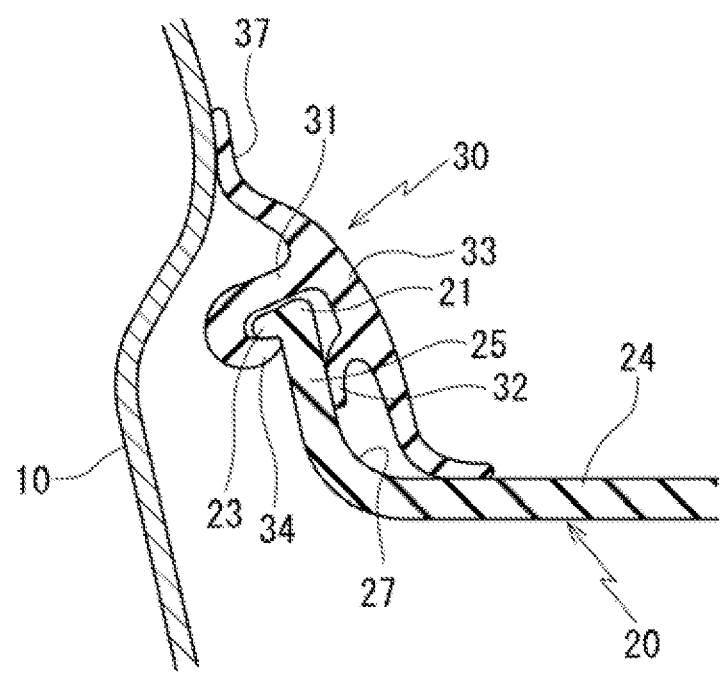
FIG. 8 is an enlarged cross section of a comparative example with respect to the cover member for automobiles according to the embodiment of the present invention.
Figure 9:
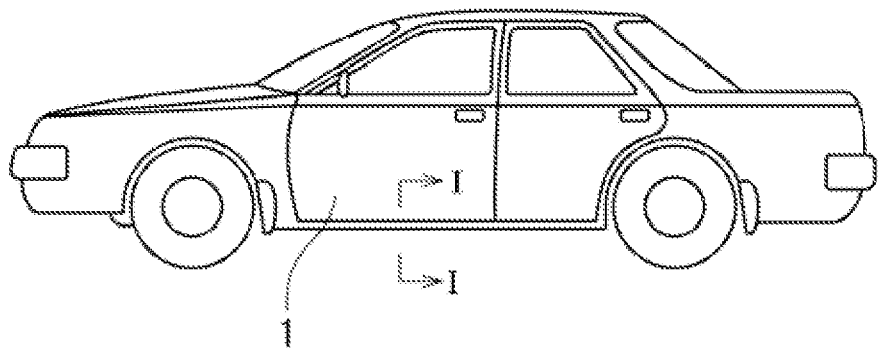
FIG. 9 is an external lateral view of an automobile.
Figure 10:
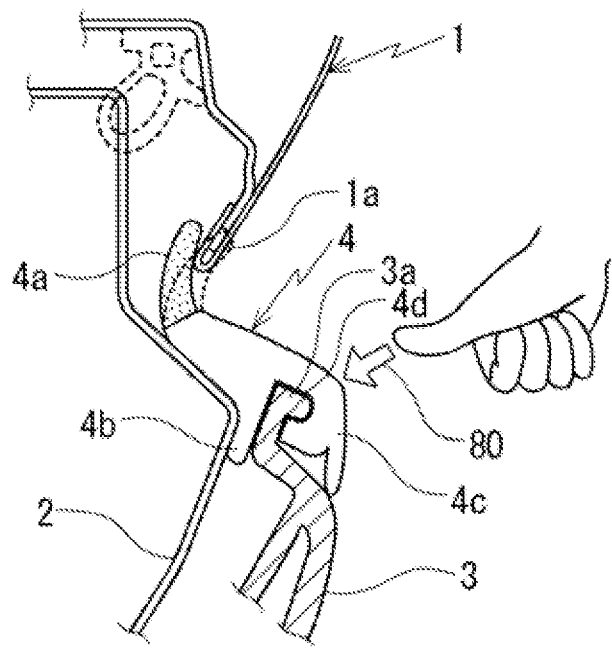
FIG. 10 is a I-I line enlarged cross section of FIG. 9, showing a state that a cover member for automobiles according to a prior art is mounted.

The projection 40 may be omitted on the outer side of the first side wall 31 as shown in FIG. 8. Alternatively, the first side wall 31 can be made of any material which improves rigidity on the outer side even in case the projection 40 on the first side wall 31 is omitted. But such a structure prevents or hampers expansion of the first side wall 31 when the protective member 30 is bent to warp so that the structure is not favorable.

In the present embodiment, the present invention is applied to a rocker panel for covering up the side sill while the panel 10 forming the article that opens and closes including the body or the door of the automobile is the side sill under right and left side doors 1 of the automobile. But the present invention is applicable to any cover member which partially covers up the panel of the automobile, comprising the cover body 20 and the protective member 30.

Accordingly, the protective member 30 can be assembled on the rocker protector according to the prior art as the cover body 20 for partially covering the rocker panel. Also, the present invention is applicable to the cover member for automobiles comprising the cover body 20 and the protective member 30 for partially covering up a body side of the automobile including a pillar part of automobiles or the article that opens and closes including the door panel, a bonnet or a sun roof panel.

I claim:

1. A cover member for an automobile for at least partially covering a panel alongside a body or a door of the automobile, the cover member comprising:
    a cover body extending lengthwise, said cover body including a first portion having an upper surface, a side wall situated at one edge of said first portion and extending upwardly, and an anchoring part formed on a top end of said side wall, said anchoring part protruding from said top end of said side wall in a direction away from said first portion;
    a protective member for fastening said side wall of said cover body to the panel,
    said protective member including
        a curved connecting wall having first and second opposite end regions;
        a first side wall extending from said first end region of said connecting wall inwardly in a direction of curvature of said connecting wall, said first side wall having a hook part on an inner side that covers said anchoring part of said cover body thereby fitting with said anchoring part, and a projection on an outer side;
        a second side wall extending from said second end region of said connecting wall inwardly in the direction of curvature of said connecting wall, said second side wall being configured to make elastic contact with a surface of said side wall of said cover body facing said first portion; and
        a first seal lip extending from an area at which said connecting wall is connected to said first side wall such that said first side wall is positioned between said first seal lip and said second side wall.

2. The cover member of claim 1, wherein said connecting wall is semicylindrically swelled and curved toward an outer side such that the direction of curvature is toward said side wall of said cover body.

3. The cover member of claim 1, wherein said second side wail extends from said connecting wall at an obtuse angle with respect to a direction in which said connecting walls extends at a location at which said second side wail extends from said connecting wall.

4. The cover member of claim 1, wherein said projection is a lump to thereby cause a portion of said first side wall at which said projection is formed to be thicker than a remaining portion of said first side wall.

5. The cover member of claim 1, wherein said projection has a substantially triangular shape in cross section.

6. The cover member of claim 1, wherein said first seal lip is curved in the same direction of curvature as said connecting wall.

7. The cover member of claim 1, wherein said first seal lip seals a space between said protective member and the panel by making elastic contact with the panel.

8. The cover member of claim 1, wherein said first seal lip has a substantially tongue shape in cross-section.

9. The cover member of claim 1, wherein said first seal lip is semicylindrically curved from said first end region.

10. The cover member of claim 1, wherein said first seal lip has a substantially tongue shape in cross-section and is semcylindrically curved from said first end region, and is configured to seal a space between said protective member and the panel by making elastic contact with the panel.

11. The cover member of claim 1, wherein said cover body further comprises a second portion that extends downwardly from an edge of said first portion opposite from said edge of said first portion from which said side wall extends upwardly.

12. The cover member of claim 1, wherein said anchoring part protrudes at substantially a right angle with respect to a direction in which said side wall of said cover body extends upward from said first portion of said cover body.

13. The cover member of claim 1, wherein said protective member extends lengthwise alongside said cover body.

14. The cover member of claim 1, wherein said protective member further comprises a second seal lip extending from said second end region of said connecting wall such that said second side wall is positioned between said second seal lip and said second side wall.

15. The cover member of claim 14, wherein said second seal lip tapers toward a top end.

16. The cover member of claim 1, wherein said first side wall extends from said connecting wall in a direction substantially at an angle of 90 degrees with respect to a direction in which said connecting wall extends at a location at which said first side wall extends from said connecting wall.

17. The cover member of claim 1, wherein said hook part defines a ditch that receives said anchoring part of said cover body.

18. The cover member of claim 1, wherein said projection is located on said first side wall in a position in which it does not abut said first seal lip.

19. The cover member of claim 1, wherein said second side wall is shorter in length than said first side wall.

20. The cover member of claim 1, wherein said first seal lip tapers toward a top end.

* * * * *